United States Patent [19]

Griffiths et al.

[11] 4,350,265

[45] Sep. 21, 1982

[54] LIQUID DISPENSER METER

[75] Inventors: Ronald S. Griffiths, Rochester; John E. Searles, Aylesford, both of England

[73] Assignee: A.G. (Patents) Limited, London, England

[21] Appl. No.: 197,222

[22] Filed: Oct. 15, 1980

[30] Foreign Application Priority Data

Oct. 17, 1979 [GB] United Kingdom ............... 7936007

[51] Int. Cl.³ .............................................. B67D 5/22
[52] U.S. Cl. .................................. 222/38; 235/94 R
[58] Field of Search .............. 235/94 R, 94 A; 222/38

[56] References Cited

FOREIGN PATENT DOCUMENTS

| | | | |
|---|---|---|---|
| 595936 | 4/1960 | Canada | 222/38 |
| 2746659 | 4/1979 | Fed. Rep. of Germany | |
| 671977 | 5/1952 | United Kingdom | |
| 857180 | 12/1960 | United Kingdom | |
| 1053267 | 12/1966 | United Kingdom | 222/38 |
| 1169641 | 11/1969 | United Kingdom | 222/38 |
| 2036695 | 7/1980 | United Kingdom | 222/38 |

Primary Examiner—L. T. Hix
Assistant Examiner—Thomas H. Tarcza
Attorney, Agent, or Firm—Bacon & Thomas

[57] ABSTRACT

A meter for a liquid dispenser of the type having an axially movable plunger. The meter includes a housing detachably mountable on the dispenser. The housing has a bore in which is engaged a sleeve on the dispenser. An annular space is provided, coaxially of the bore. In this space is provided a cylindrical actuating member, the base of which is formed as a striker. Upward sliding movement of member actuates hollow plunger so that liquid is dispensed through an aperture. Upward movement of the member also causes an operating member secured to a counter to turn, thereby advancing the counter by one digit. A spring loaded interlocking member is adapted to prevent upward movement of the actuating member if the meter is removed from the dispenser.

19 Claims, 10 Drawing Figures

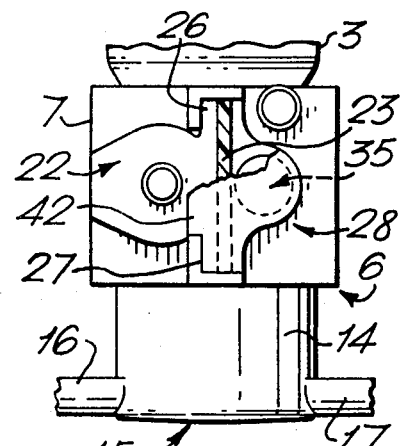

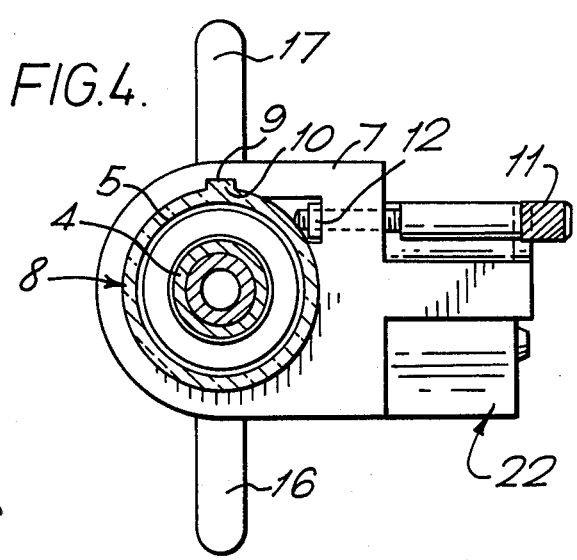
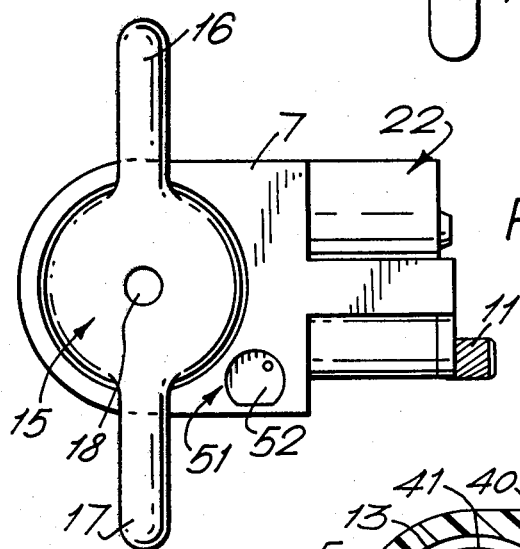
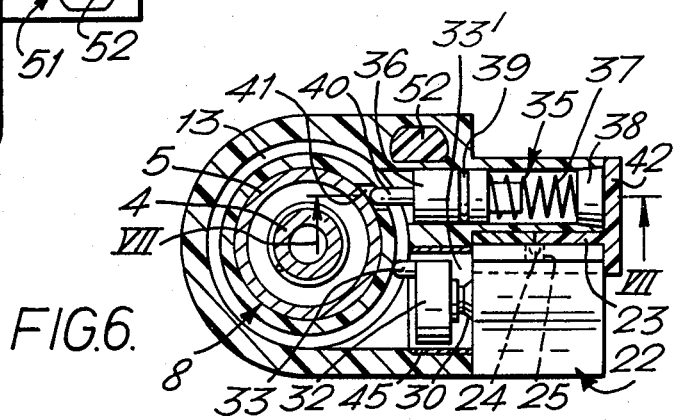

LIQUID DISPENSER METER

This invention relates to a meter for a liquid dispenser of the kind used to dispense liquids in measured quantities from bottles and other containers. Such dispensers are frequently used in bars for bottles of spirits such as whisky or gin. A typical dispenser is adapted to be mounted on the neck or mouth portion of a bottle and includes a measuring chamber and an axially movable plunger-like operating member which controls the flow of liquid from the bottle into the measuring chamber and the discharge of liquid from the measuring chamber.

It has previously been proposed that, for the purpose of stock-taking or other accounting requirements, a meter be incorporated in the dispenser, to record the number of times the dispenser has been operated. Thus the quantity of liquid dispensed from a particular bottle can be calculated.

British Patent Specification No. 1,169,641 describes a liquid dispenser incorporating such a meter. In this dispenser, the housing surrounding the operating plunger is enlarged, and carries a mechanical counter. This is actuated by an arm mounted on the plunger. The lower end of the plunger carries a striker in a conventional manner, and the dispenser and counter are operated by pressing up the striker by means of a glass.

It is important that a dispenser with a meter be tamper-proof to prevent anybody from being readily able to use the dispenser without the meter operating. In the dispenser of British Patent Specification No. 1,169,641 it would be possible to separate the counter-actuating arm from the plunger, e.g. by drilling, without interfering with the operation of the dispenser, and without the modification being externally visible.

Viewed from one aspect the present invention provides a meter for a liquid dispenser operable by means of a plunger, said meter comprising a housing adapted to surround the plunger, a striker disposed externally of the housing and being adapted to engage the plunger, a counter mounted on the housing, and a counter operating member extending from the striker into the housing to operate the counter.

By having a separate operating member extending from the striker, the operating member will be visible from outside the housing, in contrast to the operating member of British Patent Specification No. 1,169,641 which is in the form of a hidden arm projecting radially from the plunger and which does not extend from the striker.

The meter could be integral with the dispenser, or a separate unit which can be attached to and detached from the dispenser as required.

It has been found that integral meters of the type disclosed in British Patent Specification No. 1,169,641 present certain problems when it is desired to clean the dispenser. Cleaning generally requires actuation of the plunger, and this of course interferes with the readings on the meter, which will show a number higher than that corresponding to the quantity of beverages dispensed. This necessitates a "cleaning allowance" being made, which may not be accurately adhered to by operatives.

Viewed from another aspect the invention provides a meter for a liquid dispenser operable by means of a plunger, said meter comprising a housing adapted to be detachably mounted on the dispenser, surrounding the plunger, a counter mounted on the housing, an actuating member mounted on the housing and selectively movable to actuate the plunger when the housing is mounted on the dispenser, and means arranged to operate the counter upon movement of the actuating member to actuate the plunger.

Since the meter is detachable, cleaning of the dispenser presents no difficulties. Cleaning of the meter itself may be performable without movement of the actuating member. To prevent accidental movement and operation of the counter, however, there are preferably provided interlocking means which prevent operation of the counter when the meter is not attached to a dispenser. This can suitably be in the form of a spring-loaded projection which prevents movement of the actuating member when the meter is detached from a dispenser. The projection may be retracted by means of a pin, cam or other similar member which projects into the interior of the housing and is pushed outwards when the meter is placed on a dispenser, for example by means of a sleeve mounted on the dispenser and surrounding the plunger.

It will be appreciated that the actuating member can serve the function of a conventional striker, which may no longer be required to be secured to the base of the dispenser plunger. The actuating member could itself be in the form of a striker, although other arrangements would be possible, for example an arrangement similar to that disclosed in British Patent Specification No. 1,127,466 involving a finger operated lever.

Having a separable meter presents several advantages. Thus, it becomes possible to repair the dispenser without losing use of the meter, which can be transferred to a spare dispenser. Furthermore, the life of a standard dispenser is about 500 bottles, whereas that of a counter has been found to be considerably greater—say 3,000 bottles. Thus the longer life of the counter can be used to advantage by transferring the meter to new dispensers as old ones wear out or have to be serviced.

A further advantage of having a separate meter with a plunger actuating member, is that when the meter is removed it becomes difficult to operate the dispenser, thus preventing misuse of the dispenser with the meter removed.

As stressed earlier, the security of a dispenser meter against tampering is of importance, and it has been found that a particularly advantageous arrangement involves the use of a plunger actuating member which is telescopically mounted on a housing.

Thus viewed from a still further aspect the invention provides a meter for a liquid dispenser operable by means of a plunger, said meter comprising a housing, a bore within said housing adapted to receive said plunger, an annular space in said housing, coaxial with said bore, a plunger actuating member having a portion adapted to engage the plunger and a tubular portion disposed telescopically within said annular space, so as to be capable of axial movement to actuate the plunger, and a counter mounted on said housing, said tubular portion being arranged to operate the counter upon movement of the actuating member to actuate the plunger.

The tubular portion could be of any desired cross-section, e.g. square or oval, but is advantageously of circular cross-section. The circumference of the tube is preferably continuous although it might be split if desired.

This form of construction renders it possible to provide a tamper-proof meter with simple structural arrangements. The meter can of course be integral with the dispenser although it is preferably a separate unit and detachably mountable on the dispenser.

Advantageously, the upper edge of the tubular portion, within the annular space, is used to operate the counter, by engaging a suitable arm or the like. This arm may communicate with the interior of the annular space by means of a suitable aperture. The space should not however be accessible from outside of the housing.

Similarly, a spring loaded interlocking projection of the type described earlier, for use when the meter is detachable, may be engageable with the upper edge of the tubular portion. A pin operable to retract the projection when the meter is attached to a dispenser, may be extendable laterally into the bore in the housing.

The counter may be mechanical in operation, actuated by means of an arm turning a spindle. The counter will show an increase of one unit each time the dispenser is actuated to deliver a predetermined quantity of liquid. The counter preferably is such that counting is initiated before dispensing actually takes place. Advantageously, there is provision for overtravel to allow for the amount of travel of the plunger actuating member needed to dispense the liquid.

Particularly in the case of a separate meter, which may be used with dispensers having slightly different dimensions, a mechanical overtravel device may be provided. This may be integral with an arm for operating the counter.

To guard against tampering, the counter should be non-resettable, and should not be capable of continuing for any substantial distance after the upper counting capacity has been reached.

Instead of a mechanical counter, an electronic counter could be used if required. This could include an integrated circuit, and be operated by a magnetic switch. The display could be LCD, or even LED if desired. In the case of an electronic counter, output terminals could be provided, to feed a central processor for accounting purposes. Preferably the device would be battery operated—and in an advantageous arrangement there would be at least two batteries with automatic changeover, giving a life of about one year or more.

The meter preferably carries an identifying code. This could be engraved on the housing, or for example be in the form of a light-pencil code.

The housing may be constructed from any suitable material, but it is preferably moulded from a plastics material such as an ABS/Polycarbonate mixture. External surfaces may be plated with metal to enhance the appearance. Certain portions of the meter may be protected by inserts—such as of hardened stainless steel—to prevent tampering by e.g. drilling.

The invention also extends to the combination of a separate meter of the types described above, with a liquid dispenser. The dispenser is preferably provided with means adapted to interengage with means on the meter housing to locate the two together. Such means could be in the form of a lug on the dispenser, engaging in an aperture on the meter housing. The meter may be provided with a locking screw which can be tightened against a portion of the dispenser, to ensure a secure connection.

An embodiment of the invention will now be described by way of example, and with reference to the accompanying drawings, in which:

FIG. 1 is a front elevation of a meter in accordance with the invention, mounted on a dispenser;

FIG. 2 is a partial view, partly in section in the direction of arrow II on FIG. 1;

FIG. 3 is a section on the line III—III on FIG. 1;

FIG. 4 is a section on the line IV—IV on FIG. 1;

FIG. 5 is an underneath plan view of the meter in the direction of the arrow V on FIG. 1;

FIG. 6 is a section on the line VI—VI on FIG. 1 with the striker not shown;

Figure 7A:
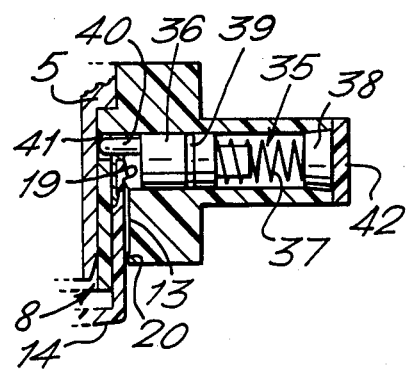
FIG. 7A is a section on the line VII—VII on FIG. 6, with part of the striker shown.
Figure 7B:
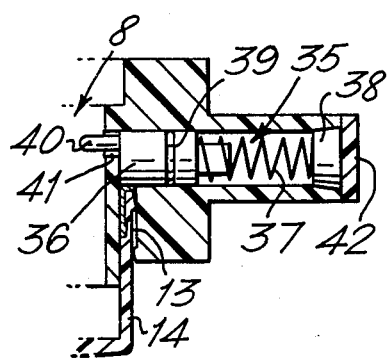
FIG. 7B is a section corresponding to that of FIG. 7A, but with the meter detached from the dispenser.
Figure 8:
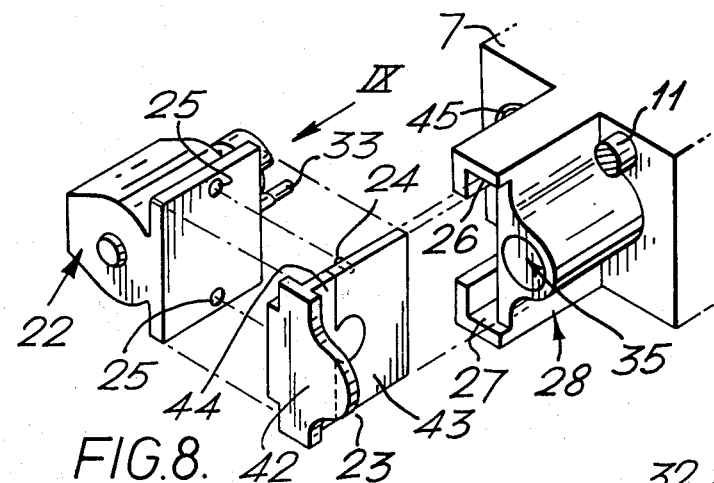
FIG. 8 is an exploded view showing how the counter is mounted on the housing.
Figure 9:
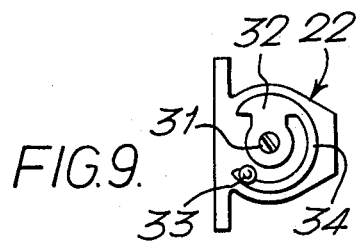
FIG. 9 is an end view of the counter in the direction of the arrow IX on FIG. 8.

Referring now to the drawings, there is shown a liquid dispenser 1 of substantially conventional construction, including a spigot 2 for engagement in the neck of a bottle, a measuring chamber 3, and a hollow operating plunger 4 through which passes a measured quantity of liquid when the plunger is pressed upwards. Around the plunger is a sleeve 5, the plunger projecting beyond the lower edge of the sleeve.

A meter 6 is detachably mountable on the dispenser 1. The meter includes a housing 7 which has a bore 8 therethrough so that the housing can be mounted on the outside of sleeve 5. In the wall of the bore 8 is a recess 9, which co-operates with a lug 10 formed on the dispenser, to prevent rotation of the meter relative to the dispenser. Location of the meter is further assisted by means of a screw 11 threaded through a nut 12 located in a recess in the wall of the bore 8. When the housing is mounted on the dispenser, screw 11 can be tightened against the sleeve 5.

Disposed coaxially around the bore 8 is an annular space 13. Within this space is slidably mounted an actuating member 14. The portion of member 14 within the space is cylindrical, and the base of the member is formed as a striker 15 having two bars 16 and 17 to engage the rim of a glass. The base is provided with an aperture 18 to permit the flow of dispensed liquid into a glass. Removal of the actuating member from the annular space 13 is prevented by means of a ridge 19 around the rim of the cylindrical portion, engageable with a ridge 20 around the base of the annular space.

The base of the actuating member is adapted to engage the end of the dispenser plunger 4, so that upward movement of the actuating member causes liquid to be dispensed. Engagement of the actuating member with the plunger is assisted by means of four upwardly extending locating members 21 formed on the base of the actuating member, the plunger being engaged within the spaced defined by these members 21. The base of the actuating member is suitably sloped and the locating members are designed and arranged such that when washing the meter water can easily self drain from the inside of the actuating member through the aperture 18.

Mounted on the housing is a counter 22. The counter is secured to a mounting plate 23, for example by solvent welding. Location of the counter is assisted by means of lugs 24 on the plate, engaging in apertures 25 on the counter 22. The assembly of counter 22 and plate 23 is mounted in channels 26 and 27 formed in an extension 28 of the housing 7, and secured for example by solvent welding.

The counter is completely sealed against moisture, to permit total immersion of the meter during cleaning. The window 29 is of polycarbonate and is heat sealed. All other joints are likewise sealed. At the spindle end a seal 30 is provided.

Mounted on the spindle 31 of the counter is an operating member 32, projecting through an aperture 33' into the annular space 13. The member 32, which can for example be secured to the spindle by means of pinning is provided with a pin 33 mounted on a curved arm 34. The pin is adapted to be engaged by the upper edge of the cylindrical portion of the actuating member, so that upward movement of the actuating member causes rotation of the spindle 31 and operation of the counter.

The arrangement is such that the counter will be operated before liquid is actually dispensed. The counter is designed to allow for a certain amount of pre-travel, about 17° of spindle rotation. About 42° of spindle rotation are then provided for counting and overtravel. With tolerances taken into account, the total angular movement is about 62°.

To take into account variations in for example the dimensions of dispensers with which the meter is used, the counter operating member 32 also serves as an overtravel device. The member is made from a resilient material, such as polycarbonate, and the arm 34 is thus capable of bending radially inwardly to absorb overtravel.

The maximum count on the counter is 99,999. After that number, a further 100 counts will be displayed, but the digits will not be centrally positioned and the overcounting will be readily apparent. In practice it is envisaged that the meter will be removed from service after 95,000 counts. The construction of the meter is such that the counter cannot be removed for repair or replacement.

The housing extension 28 is provided with a bore 35 which extends into the annular space 13. An interlocking member 36 is slidably mounted in the bore and is biased by a spring 37 to project sufficiently far into the space to prevent upward movement of the actuating member 14, and operation of the counter. Spring 37 is held in place by a plug 38 secured in the bore by for example solvent welding. A seal 39 is provided.

Mounted on the interlocking member 36 is a pin 40 which can project through an aperture 41 into the bore 8 of the housing. When the meter is mounted on the dispenser 1, sleeve 5 urges the pin 40 back against the action of spring 37, to retract the interlocking member 36 and permit movement of the plunger actuating member and operation of the counter. On the other hand, when the meter is removed from the dispenser for cleaning purposes, operation of the counter is prevented.

The end of the housing extension 28 is covered by a cover plate 42 formed as an extension of the counter mounting plate 33. The meter is preferably made from a suitable plastics material such as an ABS/Polycarbonate mixture and the external surfaces are preferably plated with metal. To permit plating of the cover plate 42 without interfering with the strength of the bond holding the counter in place, the mounting plate 23 is made in two parts 43 and 44 joined together in "jigsaw" fashion. Thus part 44 carrying cover plate 42 can be plated separately. Plating may render visible any tampering attempts, since even small marks are readily visible and scratches will show the base colour of the plastics e.g. cream.

The construction of the meter is such that it is extremely difficult to tamper with the operation of the counter, and that any attempts at tampering will be readily apparent. To increase the security of the meter, and particularly to guard against attempts to drill through essential components inserts of hardened stainless steel are used.

Thus a steel sleeve 45 is inserted in the aperture 33', around the counter operating member 32. A steel insert 46 is provided for the actuating member 14, this being click-fitted in place by means of a ridge 47 on the insert engaging over a ridge 48 on the cylindrical portion of the actuating member. The insert 46 has a cylindrical portion 49 projecting inside the cylindrical portion of the actuating member 14, and a flange 50 which projects over and protects the upper edge of the actuating member.

A bore 51 extending into the housing for moulding purposes is closed by a plug 52 securely located in the bore for example solvent welding. This plug can have an identifying code on its outer face.

The entire meter is preferably made from non-corrodible materials such as plastics, phosphor bronze, stainless steel and the like, this including the mechanism inside the counter. The counter body may be of acetyl plastics resin or the like, which can resist attack by solvents.

We claim:

1. A dispenser for dispensing a measured quantity of liquid from a supply thereof, comprising:
    (a) dispensing means, actuation of which causes a measured quantity of liquid to be dispensed;
    (b) actuating means for selectively actuating the dispensing means;
    (c) metering means for recording the number of measured quantities of liquid dispensed, the metering means being operatively connected to the actuating means; and
    (d) a housing on which the actuating means and the metering means are securely mounted;
    wherein the housing, with its associated actuating and metering means, is readily detachable from the dispensing means.

2. A dispenser as claimed in claim 1, including locking means for preventing operation of the metering means when the housing is detached from the dispensing means.

3. A dispenser as claimed in claim 2, wherein the locking means prevents movement of the actuating means when the housing is detached from the dispensing means.

4. A dispenser as claimed in claim 1, wherein the actuating means and the metering means cannot be removed from the housing.

5. A dispenser as claimed in claim 1, wherein the dispensing means includes a plunger, movement of which in one direction causes the measured quantity of liquid to be dispensed from the supply, and the actuating means is engageable with the plunger.

6. A dispenser as claimed in claim 5, wherein the housing surrounds the plunger.

7. A dispenser as claimed in claim 6 wherein the actuating means includes a striker.

8. Apparatus for use with liquid dispensing means having a plunger actuable to dispense a measured quantity of liquid from a supply thereof, said apparatus comprising:

(a) a housing adapted to be detachably mounted on the dispensing means;
(b) a bore within the housing adapted to receive the plunger when the housing is mounted on the dispensing means;
(c) a counter mounted on the housing;
(d) an actuating member mounted on the housing and selectively movable to actuate the plunger when the housing is mounted on the dispensing means; and
(e) means arranged to operate the counter upon movement of the actuating member to actuate the plunger.

9. Apparatus for use with liquid dispensing means having a plunger actuable to dispense a measured quantity of liquid from a supply thereof said apparatus comprising:
(a) a housing;
(b) a bore within said housing adapted to receive said plunger;
(c) an annular space in said housing, said annular space being coaxial with said bore;
(d) a plunger actuating member having a portion adapted to engage the plunger and a tubular portion slidably disposed within said annular space and axially movable therein; and
(e) a counter mounted on said housing, said actuating member tubular portion being arranged to operate the counter upon movement of the actuating member to actuate the plunger.

10. Apparatus as claimed in claim 9 including means for readily attaching the housing to the dispensing means, said attaching means allowing for the housing to be readily detached from the dispensing means.

11. Apparatus as claimed in claim 10 further comprising locking means having a portion adapted to extend into the annular space and restrain axial movement of the tubular portion thereby preventing operation of the counter when the housing is not mounted on the dispensing means.

12. Apparatus as claimed in claim 11 wherein said locking means includes a pin which projects into said housing bore when the housing is not mounted on the dispensing means and which is retractable when the housing is mounted on the dispensing means, retraction of the pin from the bore serving to cause retraction of the locking means portion from the annular space and render the locking means inoperable.

13. Apparatus as claimed in claim 9, wherein said counter is provided with a counter operating member disposed within said housing communicating with said annular space, and the tubular portion of the actuating member is engageable with the counter operating member within the annular space.

14. Apparatus as claimed in claim 13 wherein the counter operating member is adapted to accommodate overtravel of the tubular portion during actuation of the plunger and after operation of the counter.

15. Apparatus as claimed in claim 14 wherein the counter operating member comprises a curved resilient arm mounted on rotatable operating spindle of the counter, and a pin attached to the arm towards the free end thereof, said pin communicating with the housing annular space, overtravel of the plunger actuating member being accommodated by the resiliency of the arm.

16. Apparatus as claimed in claim 13, wherein the upper edge of the tubular portion is engaged with the counter operating member.

17. A dispenser for dispensing measured quantities of liquid from a supply thereof, comprising:
(a) dispensing means actuation of which causes a measured quantity of liquid to be dispensed;
(b) a striker selectively movable to actuate the dispensing means; and
(c) metering means for recording the number of measured quantities of liquid dispensed;
wherein the striker is detachable from the dispensing means and actuation of the dispensing means without operation of the metering means, for cleaning purposes, is only possible on detachment of the striker.

18. A dispenser as claimed in claim 17, wherein the striker and the metering means are mounted on a common housing detachable from the dispensing means, whereby detachment of the striker effects detachment of the metering means also and prevents operation of the metering means when the dispensing means is actuated for cleaning purposes.

19. A dispenser as claimed in claim 18, wherein detachment of the housing prevents operation of the metering means even on movement of the striker.

* * * * *